(No Model.)
E. M. KNIGHT.
FILTER.
No. 498,276. Patented May 30, 1893.
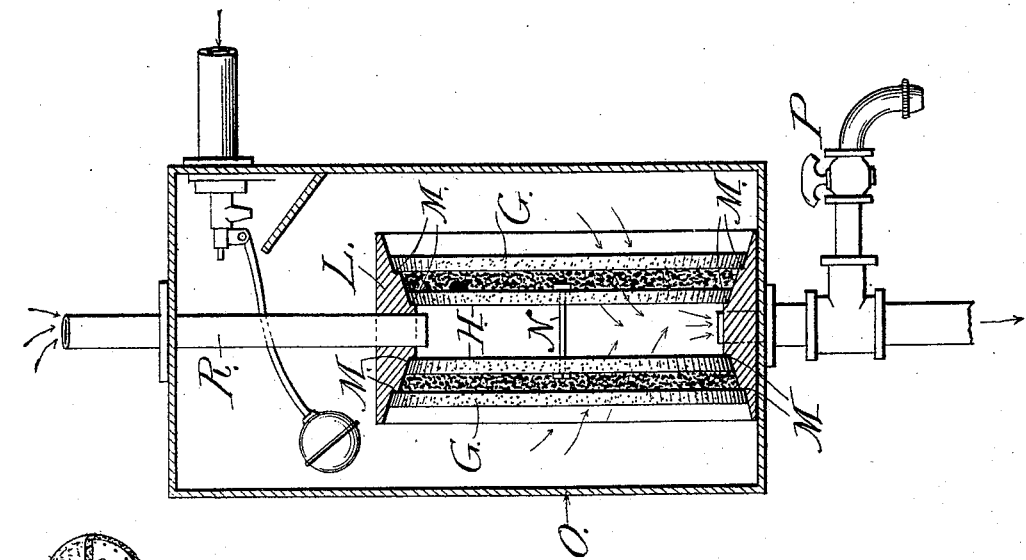
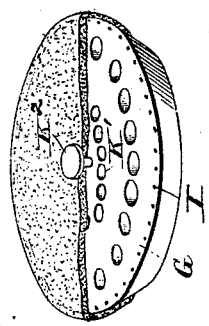
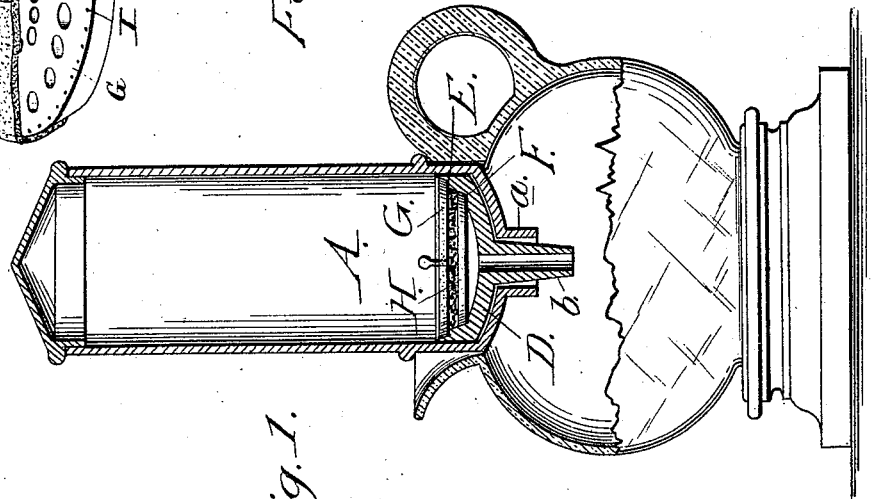
WITNESSES
Thomas Rout Jr
Chapman Fowler
INVENTOR
Edward M. Knight,
by A. H. Evans & Co.
Attorneys

UNITED STATES PATENT OFFICE.

EDWARD MARTIN KNIGHT, OF NEW YORK, N. Y.

FILTER.

SPECIFICATION forming part of Letters Patent No. 498,276, dated May 30, 1893.

Application filed January 18, 1892. Serial No. 418,486. (No model.)

*To all whom it may concern:*

Be it known that I, EDWARD MARTIN KNIGHT, a citizen of the United States, residing at New York, in the county and State of New York, have invented certain new and useful Improvements in Filters, as set forth in the accompanying drawings, forming part of this specification, in which—

Figure 1, is a sectional view of a round filter having my improved filtering disk within it. Fig. 2, is a similar view of a filter having a square or rectangular frame. Fig. 3, is an enlarged view of one of the filter disks showing a part of the fibrous covering broken away.

My invention relates to the filtration of water, for drinking purposes, and it consists of the constructions and combinations of devices which I shall hereinafter fully describe and claim.

To enable others skilled in the art to which my invention appertains to make and use the same I will now describe its construction and indicate the manner in which the same is carried out.

In carrying out my invention, I employ any well known form of filter A, round, square, rectangular or otherwise, and made of any material suitable to hold water for drinking purposes, and within such a filter the filtering disks G and H are supported either in a horizontal or vertical position.

The construction and form of the frame used to support the filter disks, will vary somewhat with the form of tank with which they are used, but the operation, and construction and arrangement of parts are practically the same in all cases.

In Fig. 1, I have shown a round portable filter of the form shown in my application filed July 13, 1891, Serial No. 399,350, where the unfiltered water chamber has an outlet *a* leading to the filtered water vessel. In the bottom of this unfiltered water chamber a filtering frame D is supported with its outlet tube *b* entering the outlet of the vessel. This frame D, when applied to the form of filter shown in Fig. 1, will be cup shaped or dished, and within it, upon suitable supporting shoulders E and F, the filtering disks G and H are placed so that they may be readily removed.

It is a recognized fact that the use of most metals in water is objectionable as they will corrode and rust and eventually cover themselves with verdigris, therefore I preferably omit metallic surfaces or parts in the formation of my filter and construct the dish-shaped frames D and the disks G and H of glass, pottery, earthenware, or other non-corrodible material.

The dish-shaped frame of Fig. 1, is round simply because the filter therein shown is cylindrical, but other forms may be given the frame as well as the disks; for instance in Fig. 2, the frame and disks will be square or rectangular or may be of oval form if desired without departing from the spirit of my invention.

In making the frames D, the shoulders E and F are formed one below or at one side of the other, so as to leave an intervening space between the disks when the latter are in place, thereby forming a chamber which may be packed with granulated charcoal (or other filtering material if desired) or the fibrous covering of the lower or inner disk can be brushed over with a thin coating of paste made by mixing powdered charcoal (or other filtering material) with water. The first or uppermost disk serves two purposes: First, to prevent the filtering material or bed being disturbed when the water to be filtered is poured in. This is more particularly the case when a fine or paste filter bed is used. Second, as a strainer to catch and hold back coarser filtrates thereby separating the coarser and fine material and preventing the filtering material from being so soon clogged up thus enabling it to be used for a much longer period. The disks are preferably also of different sizes, the inner or undermost disk being smaller in circumference than the others, which enables me to place the disks in position in the frame or remove them without difficulty.

The walls of the frame which lead to the shoulders are inclined or converge inwardly to produce a frictional binding effect when the disks are in place. In order that this latter effect may be produced in the best manner, I prefer to form the disks G and H with peripheries which are tapered or inclined to correspond with the walls leading to the shoulders and make the diameters of the disks slightly less than the diameter of the walls which bound the shoulders. This enables me to cover the upper surfaces and edges of the disks with asbestus cloth, or fibrous material, which is preferably fastened to the disks by sewing it through small holes I, formed in the disks near their peripheries; the disks being perforated with other holes K' to enable the water to pass through without obstruction.

When the frame and disks are formed as herein stated, the disks may be pressed to their seats against the shoulders and with the covered inclined edges of the disks held with sufficient friction against the inclined walls leading to the shoulders to retain them in place, and to make a water tight joint around the edges of the disks.

In order that the disks may be removed, when necessary, I employ a small removable plug or handle $K^2$ which I pass through an opening in the center of the upper and outer disk, and which is held tight enough to the disk to enable the latter to be removed. The object of making this plug or handle removable is that it enables me to stretch the fibrous covering over the disk without cutting out the center, a feature not possible if the plug was integral with the disk, and by using two or more disks the filter will run much longer without choking, and the exterior or uppermost disk, which I prefer to call the strainer may be removed and cleaned without affecting any other part of the device.

In the form of filter shown in Fig. 2, the construction is practically the same as that before described, but in this case the frame L is vertically disposed and has the shoulders M upon each side, said shoulders having the adjacent walls inclined inwardly. The disks in said Fig. 2 are in pairs and are vertically disposed and seated against the shoulders in the manner before stated, and if desired the inner disks of each pair may be united together by a tie rod N.' The frame of Fig. 2 is adapted for lateral filtration and it is located within a tank O having a draw-off cock P for the filtered water while an air pipe R enters the top of the frame to aerate the water.

Having thus described my invention, what I claim as new, and desire to secure by Letters Patent, is—

1. In a filter, a foraminous filter frame having a series of holes formed near its periphery, a fibrous covering for the edges and surface of the disk secured thereto and a plug or handle detachably fitted to the disk for effecting its removal, substantially as herein described.

2. An improved filter comprising a frame having a conical shaped interior provided with separated shoulders forming seats having unequal diameters, said shoulders joining each other by inclined walls, and asbestus covered disks seated one above the other on said seats, having inclined edges and having their covering extended over said edges to form a water tight joint with the inclined walls when the disks are forced to their seats, substantially as herein described.

3. In a filter, a filtering disk, formed of earthenware, provided with a series of holes for the escape of the water, and having a second series of holes formed through it near its outer edge, a covering of asbestus over the surface and edges of the disk and secured in place by lines of stitching passing through the series of holes near the edge of the disk, and means for removing the disk, substantially as herein described.

EDWARD MARTIN KNIGHT.

Witnesses:
HENRY J. SCHNITZER,
T. A. FAY.